UNITED STATES PATENT OFFICE.

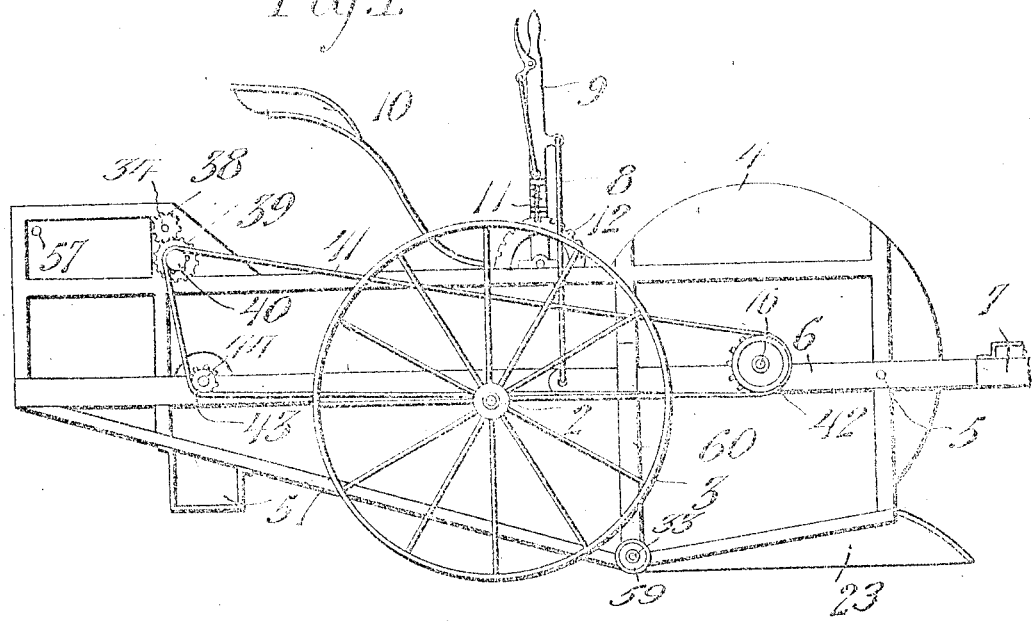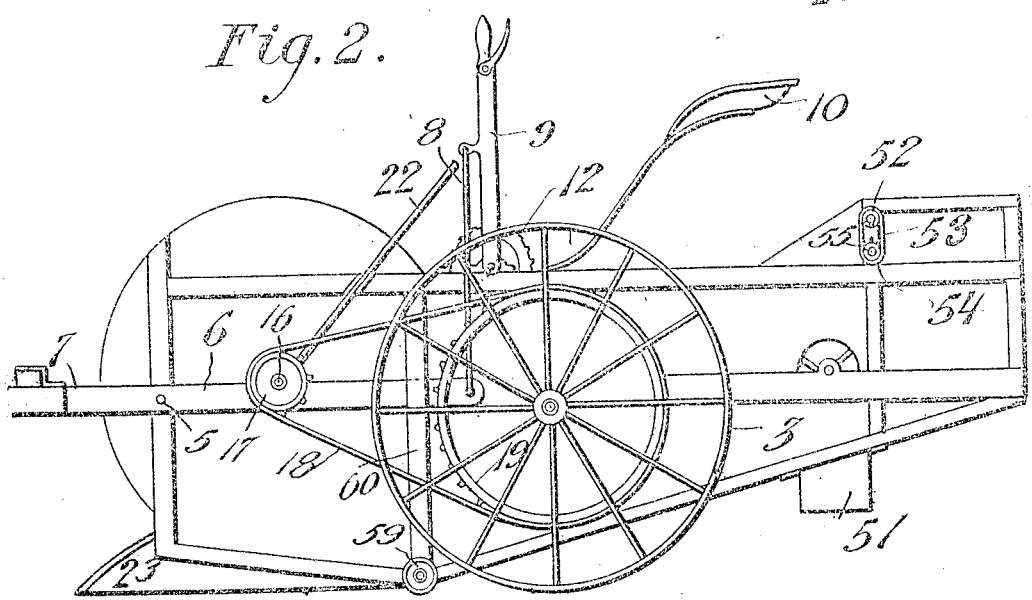

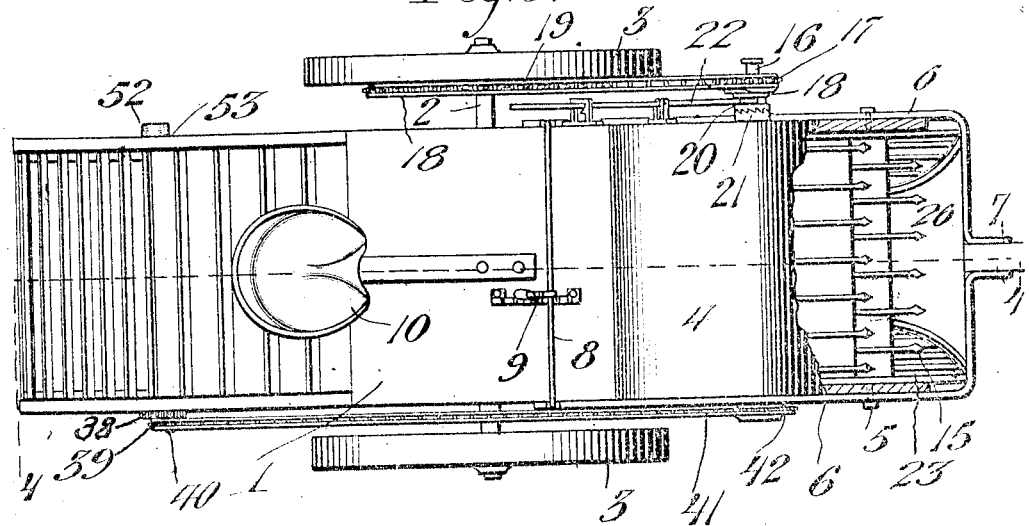
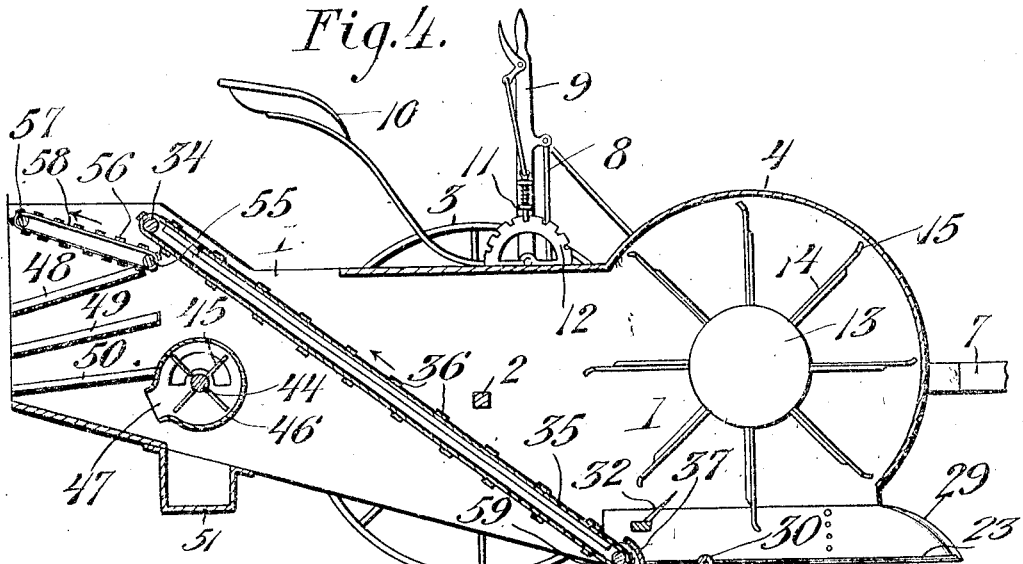
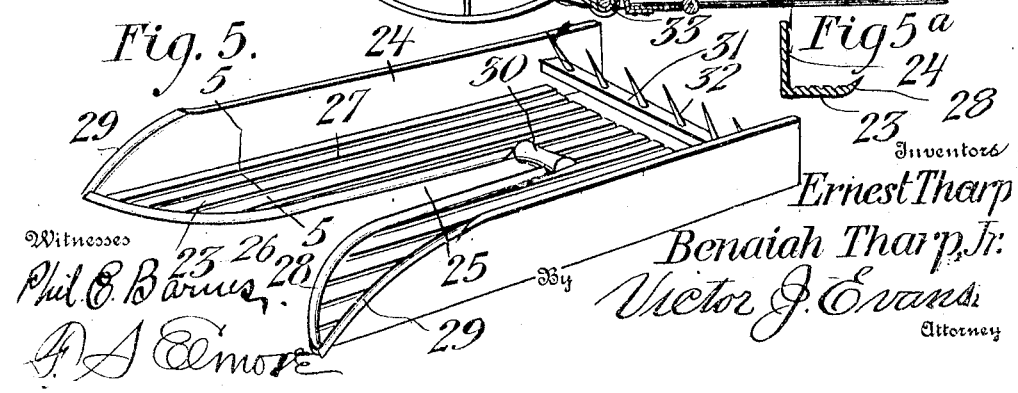

ERNEST THARP, OF NORFOLK, VIRGINIA, AND BENAIAH THARP, JR., OF HARRINGTON, DELAWARE.

PEA AND BEAN HARVESTING AND THRESHING MACHINE.

No. 856,929.  Specification of Letters Patent.  Patented June 11, 1907.

Application filed October 24, 1905. Serial No. 284,237.

*To all whom it may concern:*

Be it known that we, ERNEST THARP and BENAIAH THARP, Jr., citizens of the United States, residing at Norfolk, Virginia, and Harrington, Delaware, respectively, in the counties of Norfolk and Kent, respectively, and States of Virginia and Delaware, respectively, have invented new and useful Improvements in Pea and Bean Harvesting and Threshing Machines, of which the following is a specification.

This invention relates to pea and bean harvesting and threshing machines, and has for its objects to produce a comparatively simple, inexpensive device of this character whereby the harvesting and threshing operations will be effectually performed, one wherein the vines will upon their passage into the machine, be subjected to a thorough beating or threshing action for freeing the peas or beans therefrom, one in which the vines and other refuse will be discharged in rear of the machine, and one wherein the seed in a cleansed condition will be discharged into sacks or other suitable receptacles.

A further object of the invention is to provide a device of this character embodying a vine-collecting member whereby the vines will be properly directed to the threshing mechanism, one wherein the entrance of briers or other heavy materials into the machine is largely obviated, and one whereby the vines will be severed upon passing into the machine.

With these and other objects in view, the invention comprises the novel features of construction and combination of parts more fully hereinafter described.

In the accompanying drawings: Figure 1 is a side elevation of a machine embodying the invention. Fig. 2 is a similar view looking from the other side. Fig. 3 is a top plan view of the machine partly in section. Fig. 4 is a vertical longitudinal section taken on the line 4—4 of Fig. 3. Fig. 5 is a perspective view of the vine collecting member. Fig. 5' is a detail section taken on the line 5—5 of Fig. 5. Fig. 6 is a detail perspective view showing a slightly modified form of collecting member.

Referring to the drawings, 1 designates the frame or casing of the machine which has an axle 2 equipped with transporting wheels 3, there being formed in the casing 1 and at the forward end of the machine a hollow drum or casing 4, while pivoted at the front of the machine on a horizontal pintle or axle 5 is a substantially U-shaped draft member or frame 6 to which is connected the forwardly projecting tongue or pole 7 and the side portions or arms of which extend rearwardly along the sides of the casing 1 and are connected at their rear ends by a vertical U-shaped bail 8 engaged with an operating lever 9 pivoted on the casing 1 in convenient reach of the seat 10 and having a spring actuated pawl 11 designed for engagement with a rack 12 to normally hold the lever against movement. Journaled in the drum or casing 4 is a rotary member or cylinder 13 provided with radial beating members or arms 14 terminating at their outer ends in flattened diamond-shaped heads 15, there being loose upon the cylinder shaft 16, which projects upon one side of the casing, a sprocket pinion 17 connected by a sprocket chain 18 with a driving gear 19 fixed on the shaft 2, while carried by the hub of the pinion 17 is a clutch member 20 adapted for engagement with a corresponding clutch 21 fixed on the shaft 16 to connect the sprocket therewith for operating the cylinder 13. The clutch member 20 is adapted for movement into and out of clutching engagement with the clutch 21 by means of a lever 22 adapted for operation from the seat 10.

Sustained at the front of the machine beneath the drum 4 and constituting the bottom thereof is a vine-collecting member or table 23 preferably composed of sheet metal and having side walls 24 and a central longitudinally extending vine-receiving opening or slot 25 provided with an enlarged flaring entrance opening or mouth 26, the member or table 23, which has longitudinal grooves or channels 27, being provided marginally around the vine-receiving opening 25 and its entrance opening 26 with sharpened cutting edges or blades 28, similar sharpened blades 29 being formed at the forward ends of the walls 24, the front ends of which are downwardly and forwardly curved as seen more clearly at 29 in Fig. 4. Journaled on the table 23 at the rear end of the slot 25 is a roller 30, the purpose of which will hereinafter appear, while extended between and sustained by the sides 24 is a bar or member 3.

equipped with teeth 32 designed to coöperate with the arms 14 during the threshing operation.

Arranged in the casing 1 for travel on rollers 33, 34, is an upwardly and rearwardly inclined conveying member or table 35 in the form of an endless belt equipped with relatively spaced transversely extending slats 36 and having its lower forward end disposed at the rear end of and to receive material from the collecting member or table 23, to the rear of which there is attached a guard member or shield 37 which overlies the roller 33 and directs material onto the forward end of the conveyer, there being fixed upon one end of the shaft or roller 34 a gear 38 in mesh with a second gear 39 fixed upon a stub shaft which also carries a sprocket 40 connected by a sprocket chain 41 with a sprocket 42 fixed upon the cylinder shaft 16, the chain 41 being also arranged for travel upon a gear 43 fixed upon and for driving the shaft 44 of a blower fan 45 arranged in the main casing and housed within a fan casing 46. The fan casing has a downwardly and rearwardly inclined mouth 47 disposed for directing a current of air rearwardly beneath the lowermost of a series of vertically spaced screens 48, 49, 50, arranged at a downward and rearward inclination in the casing 1, while beneath the fan there is provided in the casing 1 a downwardly and transversely inclined chute 51 by which material is discharged into a bag or other receptacle not shown which may be suspended at the mouth of the chute.

Fixed on that end of the shaft 34 remote from the gear 38 is a belt pulley 52 connected by a belt 53 with a pulley 54 fixed upon the drive shaft 55 of a short, upwardly and rearwardly inclined skeleton conveyer 56 disposed for travel at its rear end on an idle roller or shaft 57 extended transversely of the casing 1, the conveyer 56 being composed of a series of relatively spaced slats presenting openings 58 through which the seed may escape from the conveyer onto the uppermost screen 48, it being noted in this connection that the system of gearing is such that the conveyers 35 and 56 will be driven in the direction indicated by the arrows in Fig. 4, and furthermore that the conveyers and the fan 45 are driven from the shaft of the threshing cylinder 13 which in turn is driven directly from one of the ground wheels.

Journaled on the casing 1 at the rear end of the table 23 which travels in a horizontal plane and close to the ground surface is a pair of idle rollers 59 adapted for travel on the ground surface to maintain the table 23 at a uniformly spaced distance therefrom while mounted on the sides of the casing 1 are guides 60 that will admit of vertical movement of the rear ends of the side portions or arms of the draft frame 6.

In practice, as the machine advances over the ground the pea or bean vines enter the guide opening or slot 25 and are severed under the action of the cutting edges 28, whereby they may pass readily onto the table 23 and thence to the conveyer 35, the vines being fed from the table to the conveyer under the action of the beater arms 14 which in conjunction with the teeth or fingers 32 serve to thresh the seeds from the pods, it being understood that the released seed are swept by the vines onto the conveyer 35 and delivered therefrom to the conveyer 56. As the material passes onto the last-named conveyer the vines and other refuse are delivered thereby onto the ground in rear of the machine, while the seed fall through the openings 58 onto the uppermost screen 48 and thence downward through the screens 49 and 50 to the bottom of casing 1 from which it passes into the chute 51 for delivery into the bags or other receptacles, it being understood that the screens which grow gradually finer, serve to separate the trash from the seed, while any trash which may pass with the latter through the lowermost and finest screen 50 will be discharged in rear of the machine under the action of a current of air from the fan 45.

It is to be observed that as the material passes onto the table 23, briers or other heavy material which may be mixed with the vines will be directed beneath the table by the action of roller 30, and furthermore that as the machine travels over the ground the table will be maintained in properly spaced relation to the ground surface by means of the supporting members or rollers 59. When it is desired to throw the parts of the mechanism out of action the lever 22 is manipulated for moving the clutch member 20 out of engagement with the clutch 21, thereby stopping the operation of cylinder 13 and of the conveyers and fan which are in belt connection with and driven by said cylinder, while the lever 9 may be operated for raising and lowering the forward end of the machine to accord with surface irregularities, it being apparent that when the lever is moved for raising the rear end of the draft frame 6, the latter will, in turning on its pivot 5 and owing to the forward end of the tongue 7 being sustained by the neck yoke lift the forward end of the machine from the ground.

It is to be particularly noted that in the operation of the machine the peas and beans are harvested, threshed and delivered in a comparatively clean condition into the sacks or other receptacles.

In Fig. 6 there is illustrated a slightly modified form of the collecting member or table 23, which in this instance is provided with a pair of entrance openings or slots 25, as distinguished from the form of the device above described, which has but one entrance opening, the modified form being designed for harvesting double rows of peas or beans.

From the foregoing it is apparent that I produce a simple device admirably adapted for the attainment of the ends in view, it being understood that in attaining these ends minor changes in the details herein set forth may be resorted to without departing from the spirit of the invention.

Having thus fully described our invention, what we claim as new is:

1. In a pea and bean harvester, a table having forwardly diverging blades adapted for cutting the vines and directing them onto the table, threshing mechanism arranged to act on the vines and feed them rearwardly on the table, conveying mechanism for carrying the vines to and delivering them at the rear of the machine, and means for separating the threshed seed from the vines prior to discharge of the latter.

2. In a pea and bean harvester, a table provided with a longitudinal, outwardly flaring entrance opening and having cutting knives arranged at opposite sides of said opening for cutting the vines and directing them onto the table, a rotary threshing drum arranged above the latter and adapted to thresh the material and feed the same rearwardly on the table, conveyers disposed for receiving the material from the table and discharging the same at the rear end of the machine, and mechanism for separating the threshed seed from the material prior to discharge of the latter.

3. In a pea and bean harvester, a collecting table having cutting knives adapted to cut the vines, a rotary threshing drum arranged above the table and having beater arms for threshing the material and feeding the same rearwardly on the table, a conveyer belt operable for carrying the material from the table rearwardly in the machine, a second belt adapted to receive the material from the first named belt and discharge the same at the rear of the machine, said second belt being provided with openings through which the seed fall, a system of screens arranged beneath the second belt for separating and cleaning the seed, and means for operating all of said parts.

In testimony whereof, I affix my signature in presence of two witnesses.

ERNEST THARP.

Witnesses:
PHILIP M. PRESCOTT, JR.,
LEE S. GERY.

In testimony whereof, I affix my signature in presence of two witnesses.

BENAIAH THARP, JR.

Witnesses:
J. WILL POWELL,
B. IRVING SHAW.